US011060660B2

(12) United States Patent
Fehr et al.

(10) Patent No.: US 11,060,660 B2
(45) Date of Patent: Jul. 13, 2021

(54) DISPLAY MOUNTING BRACKET

(71) Applicant: CKnapp Sales, Inc., Goodfield, IL (US)

(72) Inventors: Micah Fehr, Danvers, IL (US); Brandon Meyer, Normal, IL (US)

(73) Assignee: CKnapp Sales, Inc., Goodfield, IL (US)

( * ) Notice: Subject to any disclaimer, the term of this patent is extended or adjusted under 35 U.S.C. 154(b) by 148 days.

(21) Appl. No.: 16/537,789

(22) Filed: Aug. 12, 2019

(65) Prior Publication Data
US 2021/0048144 A1 Feb. 18, 2021

(51) Int. Cl.
| *F16M 11/00* | (2006.01) |
| *F16M 13/02* | (2006.01) |
| *F16B 2/12* | (2006.01) |
| *F16M 11/04* | (2006.01) |
| *A47B 97/00* | (2006.01) |

(52) U.S. Cl.
CPC ............. *F16M 13/022* (2013.01); *F16B 2/12* (2013.01); *F16M 11/041* (2013.01); *A47B 97/001* (2013.01)

(58) Field of Classification Search
CPC .... F16M 13/022; F16M 13/00; F16M 11/041; F16M 11/00; F16M 11/04; F16B 2/12; F16B 2/00; A47B 97/00
See application file for complete search history.

(56) References Cited

U.S. PATENT DOCUMENTS

| 3,188,028 | A | * | 6/1965 | Waller | A47G 1/215 |
| | | | | | 248/489 |
| D480,237 | S | * | 10/2003 | de Carolis | F16M 11/041 |
| | | | | | D6/675.3 |
| 8,276,864 | B2 | * | 10/2012 | Ye | F16M 11/04 |
| | | | | | 248/287.1 |
| 9,523,461 | B2 | * | 12/2016 | Kuan | F16M 13/02 |
| 9,775,264 | B1 | * | 9/2017 | Chiu | F16M 11/041 |
| 2013/0153726 | A1 | * | 6/2013 | Truckor | F16M 11/30 |
| | | | | | 248/235 |
| 2015/0250315 | A1 | * | 9/2015 | Gross | H05K 5/0017 |
| | | | | | 361/679.01 |

* cited by examiner

*Primary Examiner* — Amy J. Sterling
(74) *Attorney, Agent, or Firm* — Marshall, Gerstein & Borun LLP (57) ABSTRACT

A display mounting bracket includes a horizontal mounting arm and a mounting plate and first and second vertical mounting arms attached to the horizontal mounting arm. The first and second vertical mounting arms are movable and positionable at multiple positions along a longitudinal axis of the horizontal mounting arm and have display brackets attached to opposite ends of the first and second vertical mounting arms. A first compression pad is movably secured to the first vertical mounting arm and a second compression pad is movably secured to the second vertical mounting arm.

20 Claims, 9 Drawing Sheets

DISPLAY MOUNTING BRACKET

FIELD OF THE INVENTION

This disclosure relates to display mounting brackets and, in particular, to mounting brackets for use with displays that do not include a VESA mounting pattern or other mounting structure.

BACKGROUND

Some displays, such as computer monitors, include a VESA mounting pattern on the back of the display that allows the display to be attached to a VESA standard mounting bracket. The VESA standard mounting bracket attached to the display can then be used to mount the display to a mounting arm, a wall mount, or many other mounting structures. However, many displays, such as televisions, do not include a VESA mounting pattern, or any other mounting structure, on the display. Therefore, there is a need for a mounting bracket that can be used with displays that do not include a VESA mounting pattern, or any other mounting structure, on the display to be able to mount the displays to a mounting arm, a wall mount, or other mounting structure.

SUMMARY

In accordance with one exemplary aspect of the present invention, a display mounting bracket includes a horizontal mounting arm and a mounting plate and first and second vertical mounting arms attached to the horizontal mounting arm. The first and second mounting arms are movable and positionable at multiple positions along a longitudinal axis of the horizontal mounting arm. First and second display brackets are attached to first and second opposite ends of the first vertical mounting arm and third and fourth display brackets are attached to first and second opposite ends of the second vertical mounting arm. A first compression pad is movably secured to the first vertical mounting arm and a second compression pad is movably secured to the second vertical mounting arm.

In further accordance with any one or more of the foregoing exemplary aspects of the present invention, the display mounting bracket may further include, in any combination, any one or more of the following preferred forms.

In one preferred form, the horizontal mounting arm comprises a pair of opposing protrusions configured to receive the mounting plate and an aperture configured to receive a threaded member to secure the mounting plate to the horizontal mounting arm.

In another preferred form, the mounting plate is configured to be attached to a VESA standard compliant mounting plate.

In another preferred form, the horizontal mounting arm comprises a plurality of slots formed in an edge of the horizontal mounting arm and spaced apart along the longitudinal axis of the horizontal mounting arm. The first vertical mounting arm comprises a first plurality of protrusions spaced apart along a longitudinal axis of the first vertical mounting arm, the first plurality of protrusions configured to engage the plurality of slots in the horizontal mounting arm such that the first vertical mounting arm is positionable at multiple positions along the longitudinal axis of the horizontal mounting arm and at multiple positions along the longitudinal axis of the first vertical mounting arm and the second vertical mounting arm comprises a second plurality of protrusions spaced apart along a longitudinal axis of the second vertical mounting arm, the second plurality of protrusions configured to engage the plurality of slots in the horizontal mounting arm such that the second vertical mounting arm is positionable at multiple positions along the longitudinal axis of the horizontal mounting arm and at multiple positions along the longitudinal axis of the second vertical mounting arm.

In another preferred form, the first and second vertical mounting arms are secured to the horizontal mounting arm by threaded members extending through apertures in the horizontal mounting arm and threaded into threaded apertures in the first and second vertical mounting arms.

In another preferred form, a length of the first and second vertical mounting arms is adjustable.

In another preferred form, the first, second, third, and fourth display brackets have a body portion and a flange that extends generally orthogonal to the body portion.

In another preferred form, the first and second display brackets are positionable in multiple positions to adjust a distance between the first vertical mounting arm and the flanges of the first and second display brackets and the third and fourth display brackets are positionable in multiple positions to adjust a distance between the second vertical mounting arm and the flanges of the third and fourth display brackets.

In another preferred form, the first and second display brackets are rotatable relative to the longitudinal axis of the first vertical mounting arm and the third and fourth display brackets are rotatable relative to the longitudinal axis of the second vertical mounting arm.

In another preferred form, the first compression pad is movably secured to the first vertical mounting arm through a first threaded post that is threaded into a threaded aperture in the first vertical mounting arm such that a distance between the first vertical mounting arm and the first compression pad is adjustable and the second compression pad is movably secured to the second vertical mounting arm through a second threaded post that is threaded into a threaded aperture in the second vertical mounting arm such that a distance between the second vertical mounting arm and the second compression pad is adjustable.

In another preferred form, the first and second compression pads are attached to the first and second threaded posts through ball joints.

In accordance with another exemplary aspect of the present invention, a method of mounting a display includes the steps of: adjusting a length of a first vertical mounting arm and a length of a second vertical mounting arm to correspond to a height of the display; positioning the first and second vertical mounting arms horizontally along a horizontal mounting arm, wherein a distance between the first and second mounting arms is determined based on a width of the display, and vertically relative to the horizontal mounting arm such that the horizontal mounting arm is generally centered along the length of the first vertical mounting arm and the length of the second vertical mounting arm and attaching the first vertical mounting arm and the second vertical mounting arm to the horizontal mounting arm; attaching a first pair of display brackets to a first end and a second end of the first vertical mounting arm such that a flange of each of the pair of display brackets is spaced apart from the first vertical mounting arm by a distance that is greater than a depth of the display and the flanges are parallel or tangent to a front surface of the display and attaching a second pair of display brackets to a first end and a second end of the second vertical mounting arm such that a flange of each of the pair of display brackets is spaced apart from the second vertical mounting arm by a distance that is greater than the depth of the display and the flanges are parallel or tangent to the front surface of the display; positioning the display between the first pair of display brackets and the second pair of display brackets; adjusting a plurality of compression pads movably secured to the first vertical mounting arm and the second vertical mounting arm to secure the display between the plurality of compression pads and the flanges of the first and second pairs of display brackets; and attaching the horizontal mounting arm to a mounting plate.

In further accordance with any one or more of the foregoing exemplary aspects of the present invention, the method of mounting a display may further include, in any combination, any one or more of the following preferred forms.

In one preferred form, the first and second vertical mounting arms are positioned horizontally along the horizontal mounting arm and vertically relative to the horizontal mounting arm by inserting a protrusion of a plurality of protrusions on the first vertical mounting arm into a first slot of a plurality of slots formed in an edge of the horizontal mounting arm and inserting a protrusion of a plurality of protrusions on the second vertical mounting arm into a second slot of the plurality of slot in the horizontal mounting arm.

In another preferred form, the plurality of protrusions on the first vertical mounting arm are spaced apart along a longitudinal axis of the first vertical mounting arm, the plurality of protrusions on the second vertical mounting arm are spaced apart along a longitudinal axis of the second vertical mounting arm, and the plurality of slots spaced apart along a longitudinal axis of the horizontal mounting arm.

In another preferred form, the first and second vertical mounting arms are attached to the horizontal mounting arm inserting threaded members through apertures formed in the horizontal mounting arm and threading the threaded members into threaded apertures formed in the first and second vertical mounting arms.

In another preferred form, the first pair of display brackets are attached to the first and second ends of the first vertical mounting arm by inserting threaded members through a selected aperture of a plurality of apertures in each of the first pair of display brackets and threading the threaded members into threaded apertures in the first and second ends of the first vertical mounting arm and the second pair of display brackets are attached to the first and second ends of the second vertical mounting arm by inserting threaded members through a selected aperture of a plurality of apertures in each of the second pair of display brackets and threading the threaded members into the threaded apertures in the first and second ends of the second vertical mounting arm.

In another preferred form, the plurality of compression pads are movably secured to the first and second vertical mounting arms by threaded posts that are threaded into threaded apertures in the first and second vertical mounting arms and a distance between the first and second vertical mounting posts and the plurality of compression pads is adjustable by rotating the threaded posts within the threaded apertures in the first and second vertical mounting posts.

In another preferred form, the horizontal mounting arm is attached to the mounting plate by inserting the mounting plate between a pair of opposing protrusions in the horizontal mounting arm, inserting a threaded member through an aperture in the mounting plate, and threading the threaded member into a threaded aperture in the horizontal mounting arm.

In accordance with another exemplary aspect of the present invention, a display mounting bracket includes a horizontal mounting arm and a mounting plate and first and second vertical mounting arms attached to the horizontal mounting arm with a means for adjusting a length of the first and second mounting arms and a means for positioning the first and second vertical mounting arms horizontally along the horizontal mounting arm and vertically relative to the horizontal mounting arm such that the horizontal mounting arm is generally centered along the length of the first vertical mounting arm and the length of the second vertical mounting arm. First and second display brackets are attached to a first end and a second end of the first vertical mounting arm with a means for adjusting a distance between a flange of each of the first and second display brackets and the first vertical mounting arm. Third and fourth display brackets attached to a first end and a second end of the second vertical mounting arm with a means for adjusting a distance between a flange of each of the third and fourth display brackets and the second vertical mounting arm. A first compression pad is movably secured to the first vertical mounting arm with a means for adjusting a distance between the first compression pad and the first vertical mounting arm and a second compression pad is movably secured to the second vertical mounting arm with a means for adjusting a distance between the second compression pad and the second vertical mounting arm.

In further accordance with any one or more of the foregoing exemplary aspects of the present invention, the display mounting bracket may further include, in any combination, any one or more of the following preferred forms.

In one preferred form, the means for positioning the first and second vertical mounting arms comprises a plurality of slots formed in an edge of the horizontal mounting arm and spaced apart along a longitudinal axis of the horizontal mounting arm, a first plurality of protrusions spaced apart along a longitudinal axis of the first vertical mounting arm and configured to engage the plurality of slots in the horizontal mounting arm, and a second plurality of protrusions spaced apart along a longitudinal axis of the second vertical mounting arm and configured to engage the plurality of slots in the horizontal mounting arm.

In another preferred form, the means for adjusting the distance between the flanges of the first and second display brackets and the first vertical mounting arm comprises threaded members inserted through a selected aperture of a plurality of apertures in each of the first and second display brackets and threaded into threaded apertures in first and second ends of the first vertical mounting arm.

In another preferred form, the means for adjusting the distance between the flanges of the third and fourth display brackets and the second vertical mounting arm comprises threaded members inserted through a selected aperture of a plurality of apertures in each of the third and fourth display brackets and threaded into threaded apertures in first and second ends of the first vertical mounting arm.

In another preferred form, the means for adjusting the distance between the first compression pad and the first vertical mounting arm comprises a threaded post threaded into a threaded aperture in the first vertical mounting arm and connected to the first compression pad.

In another preferred form, the means for adjusting the distance between the second compression pad and the second vertical mounting arm comprises a threaded post threaded into a threaded aperture in the second vertical mounting arm and connected to the second compression pad.

BRIEF DESCRIPTION OF THE DRAWINGS

The Figures described below depict various aspects of the systems, devices, and/or methods disclosed therein. It should be understood that each Figure depicts an embodiment of a particular aspect of the disclosed systems, devices, and/or methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
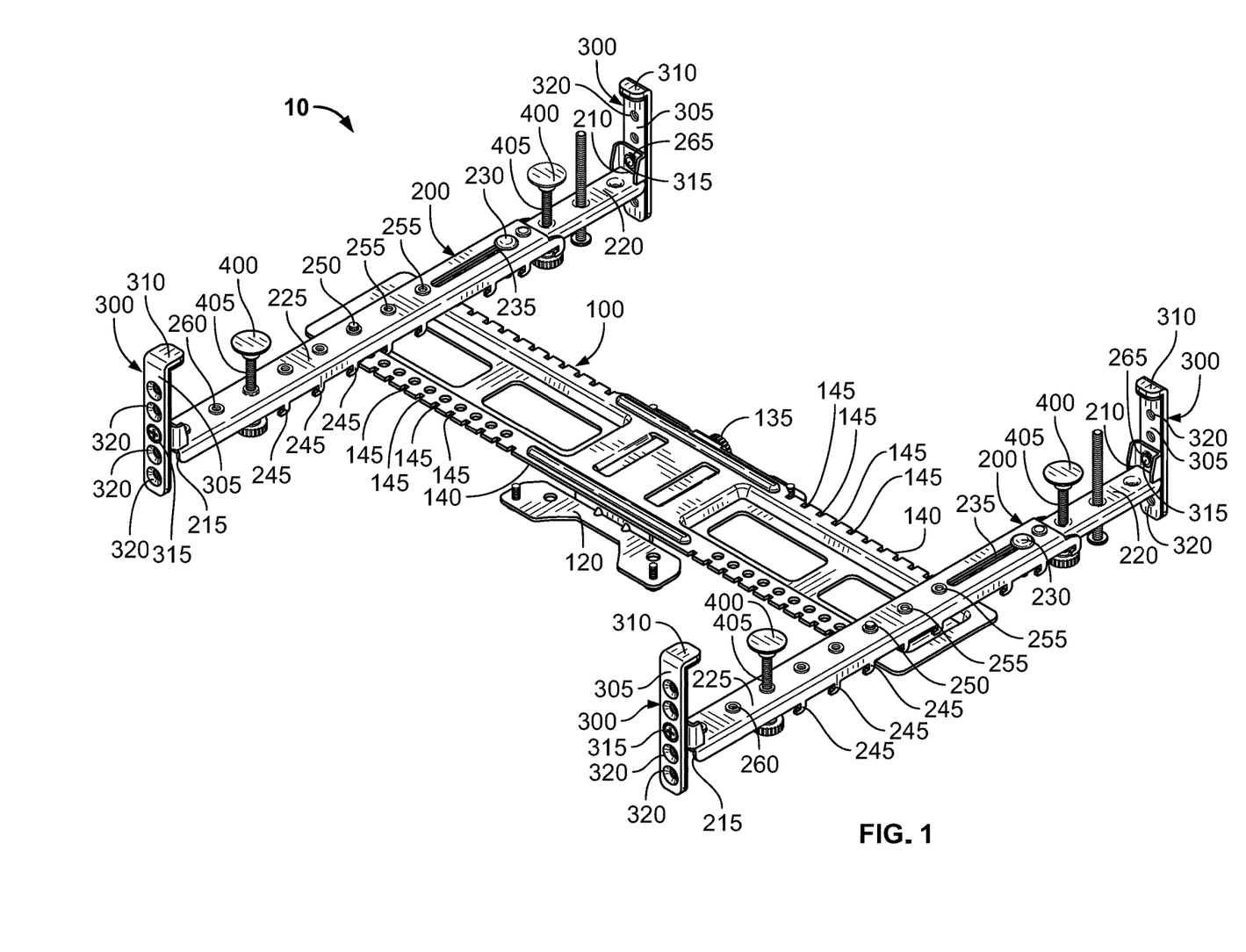
FIG. 1 is a perspective view of an example display mounting bracket.
Figure 2:
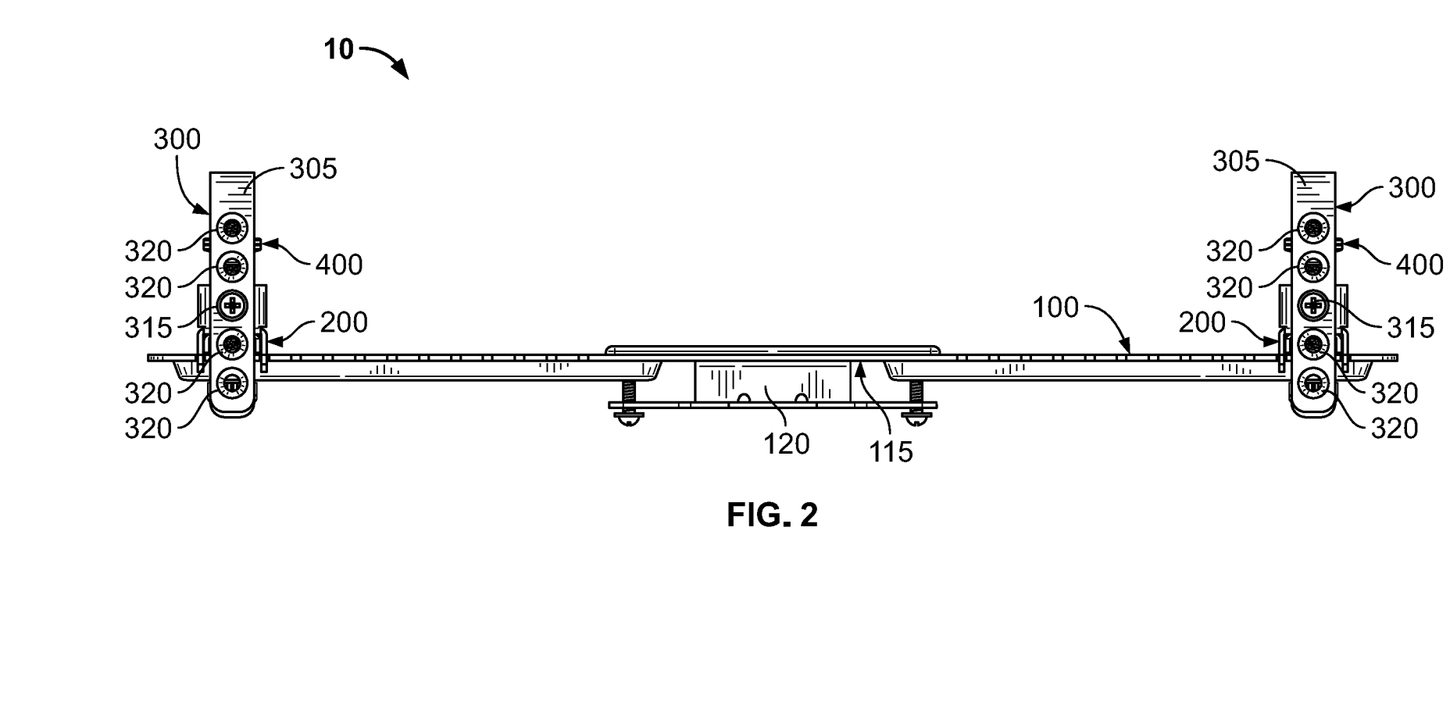
FIG. 2 is a top view of the example display mounting bracket of FIG. 1.
Figure 3:
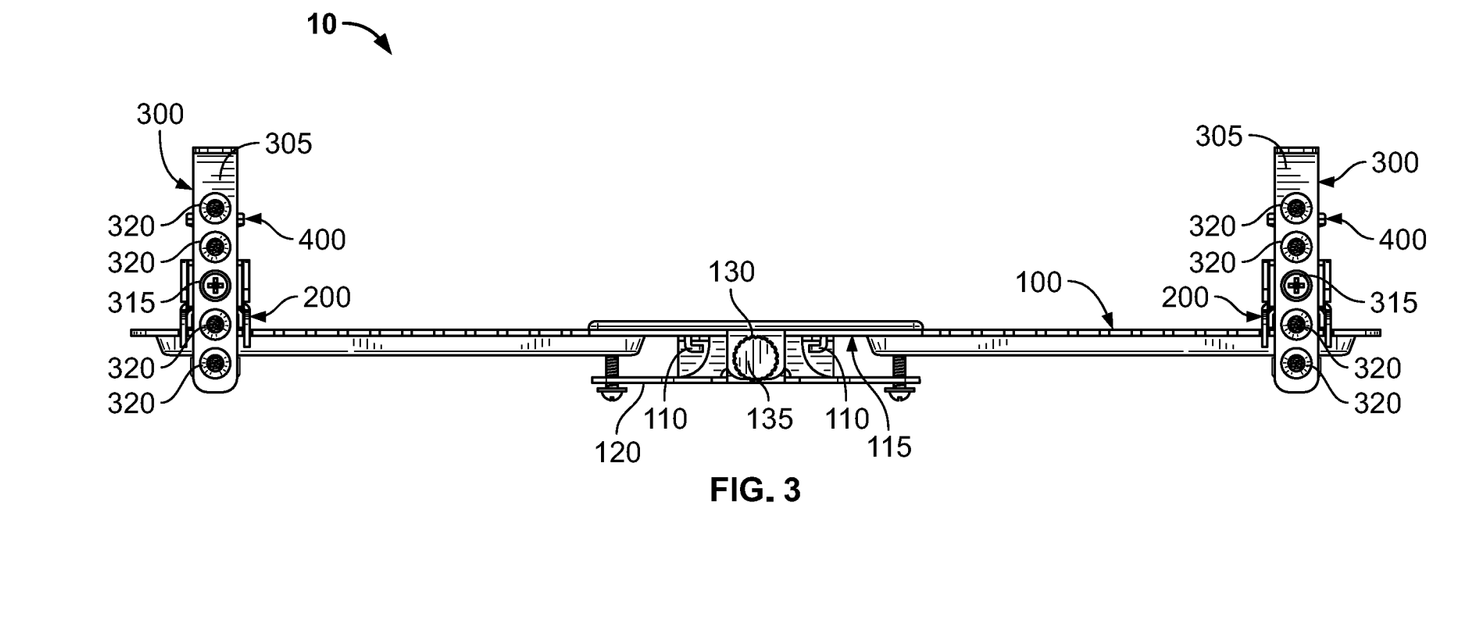
FIG. 3 is a bottom view of the example display mounting bracket of FIG. 1.
Figure 4:
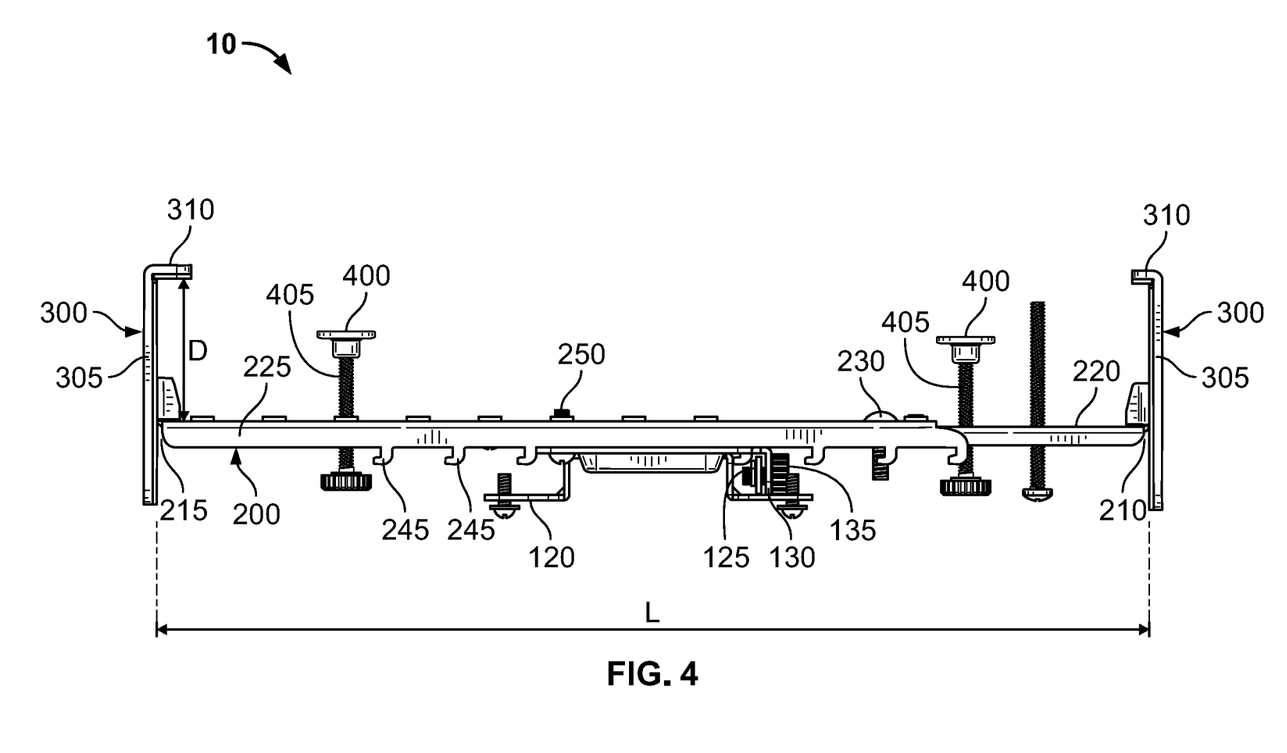
FIG. 4 is a left-side view of the example display mounting bracket of FIG. 1.
Figure 5:
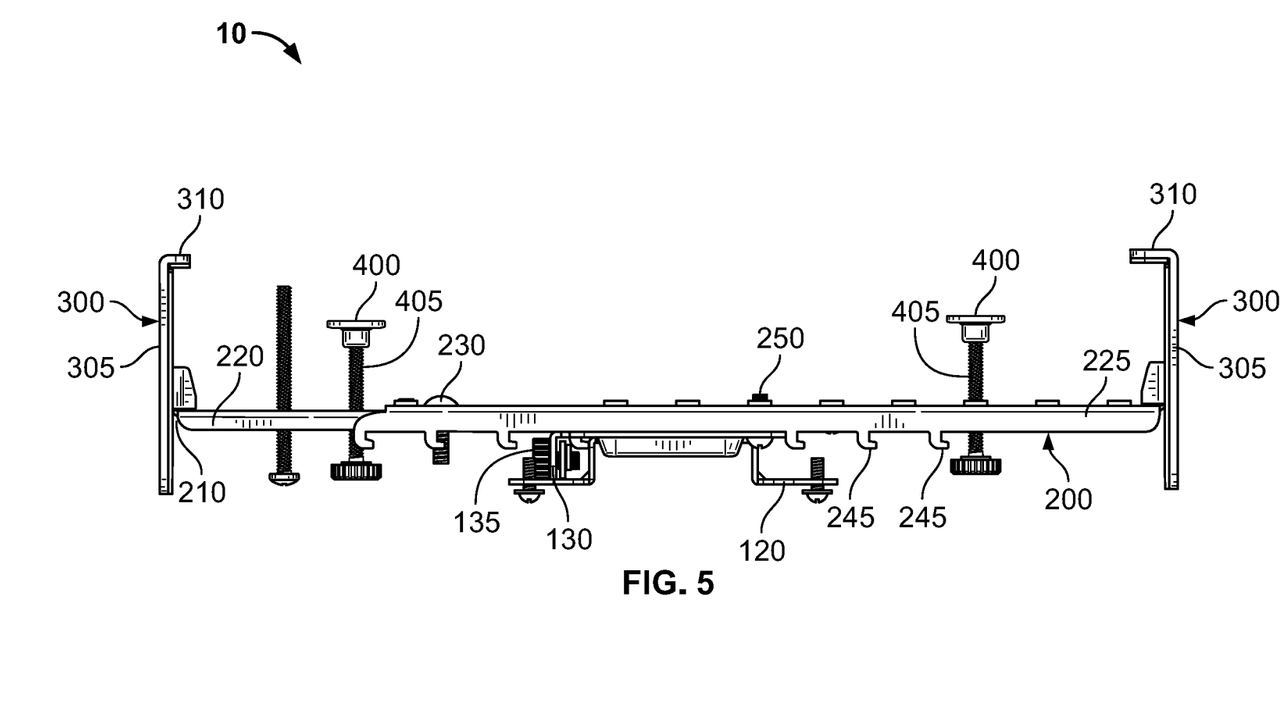
FIG. 5 is a right-side view of the example display mounting bracket of FIG. 1.
Figure 6:
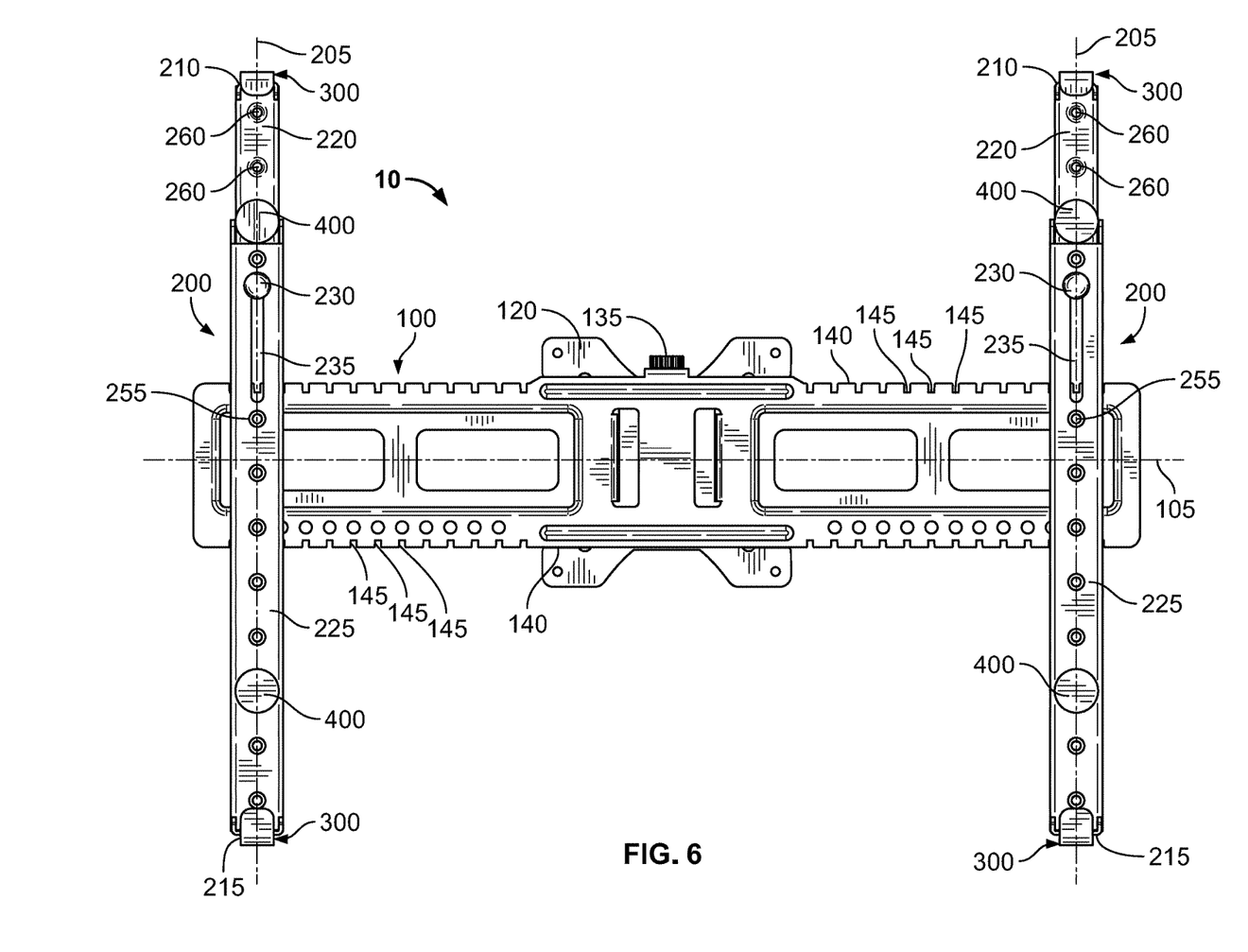
FIG. 6 is a front view of the example display mounting bracket of FIG. 1.
Figure 7:
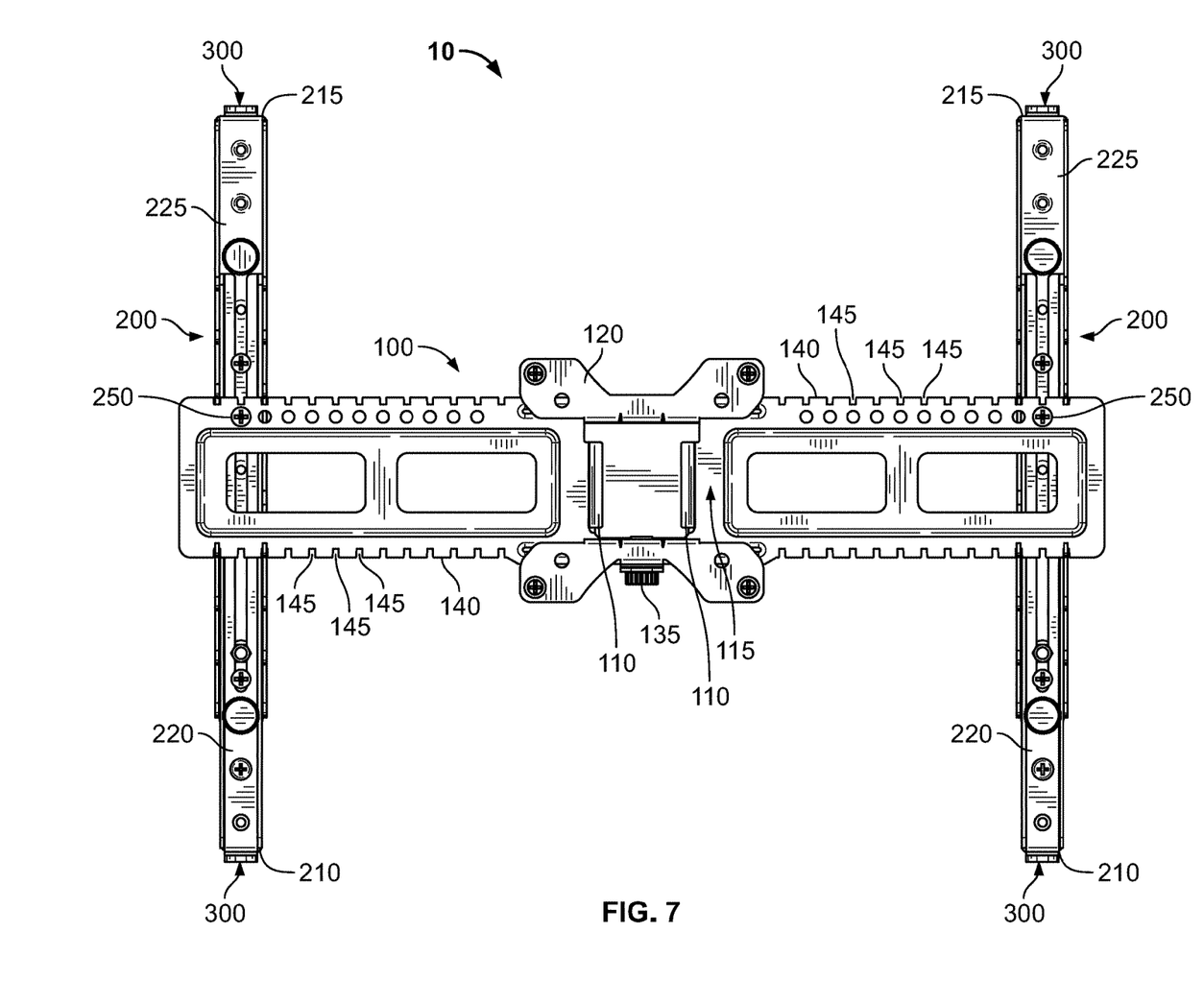
FIG. 7 is a rear view of the example display mounting bracket of FIG. 1.
Figure 8:
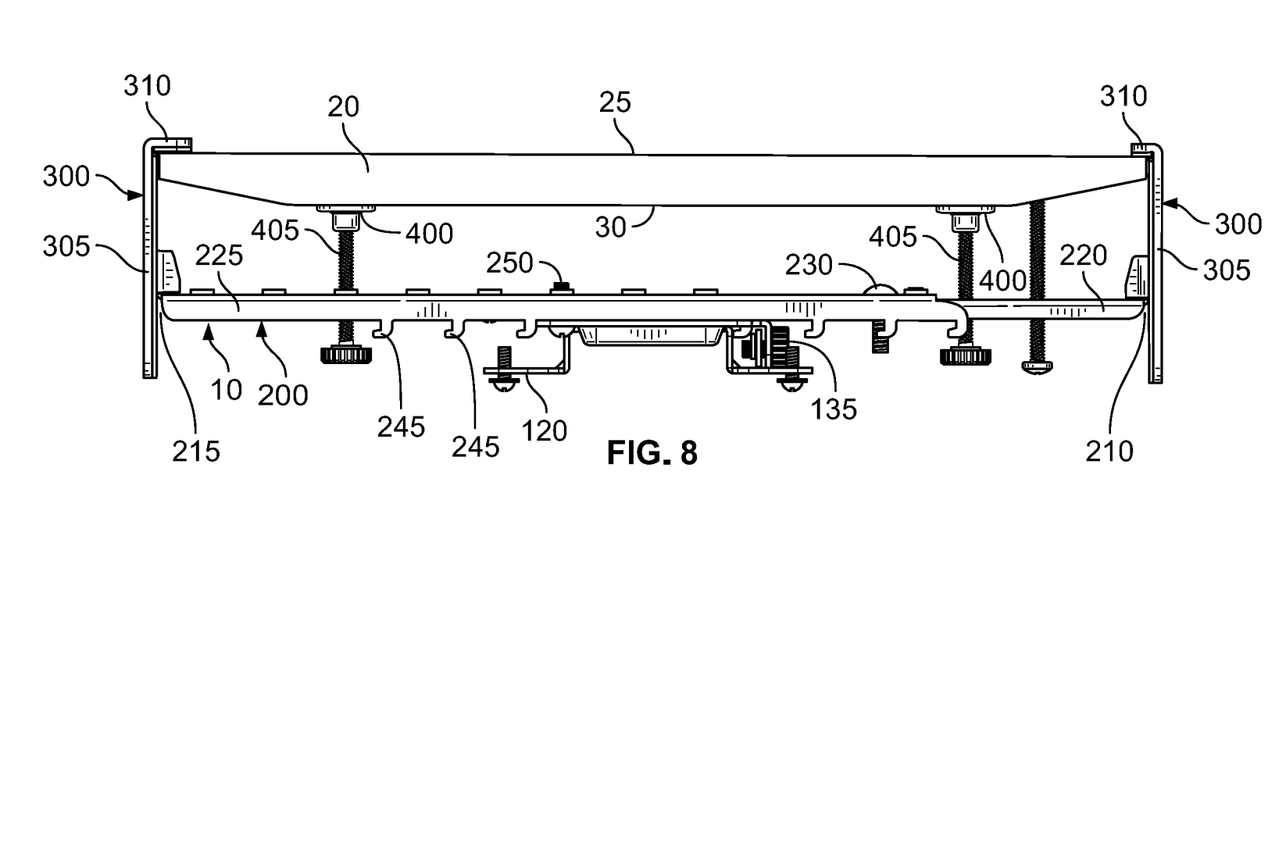
FIG. 8 is a left-side view of the example display mounting bracket of FIG. 1 with a display mounted in the example display mounting bracket.
Figure 9:
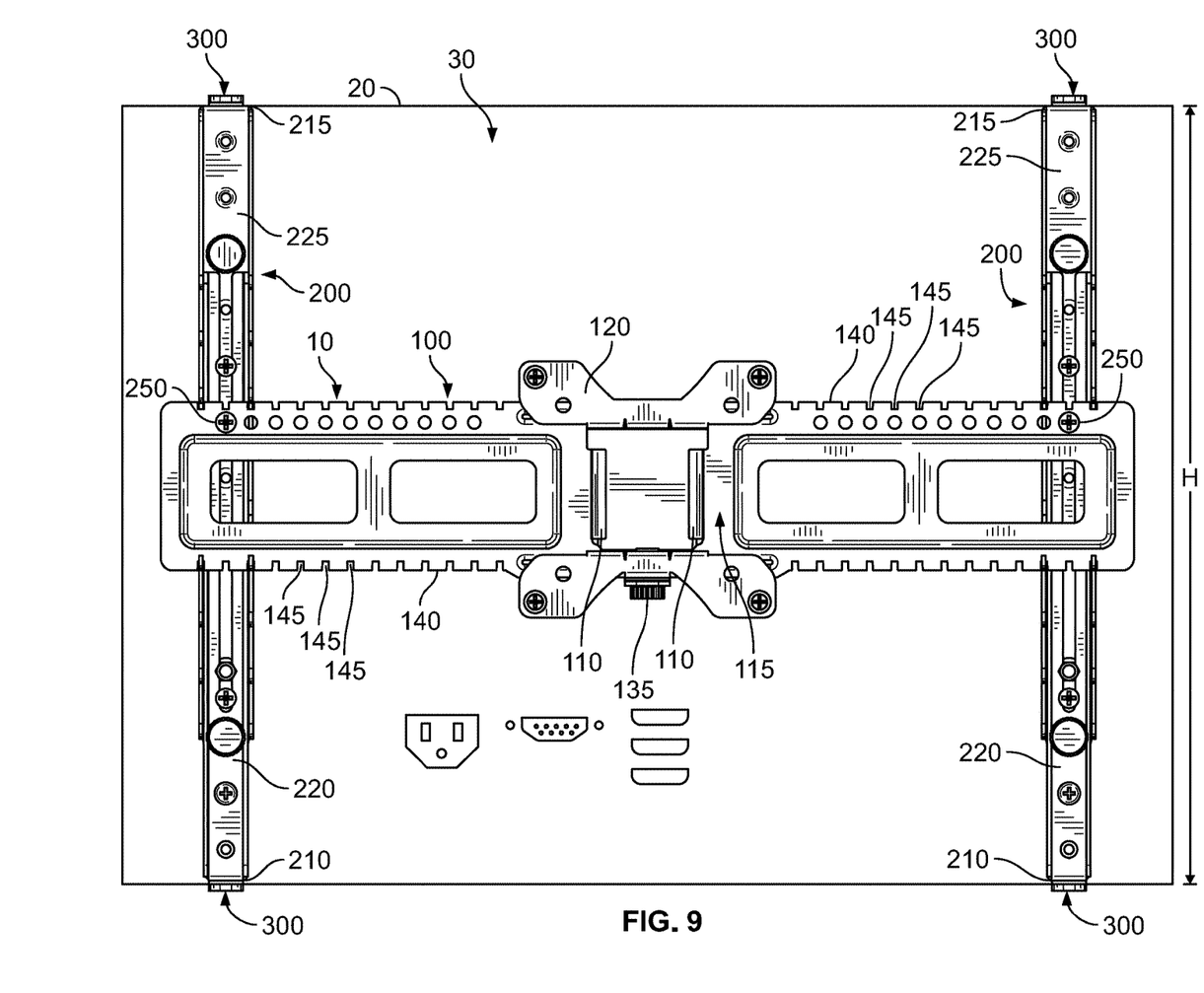
FIG. 9 is a rear view of the example display mounting bracket and display of FIG. 8.

The Figures depict preferred embodiments for purposes of illustration only. Alternative embodiments of the systems and methods illustrated herein may be employed without departing from the principles of the invention described herein.

DETAILED DESCRIPTION

The embodiments shown and described herein provide a display mounting bracket that fits and can be used with all display types, shapes, and sizes, including displays that do not include VESA compatible mounting capabilities, displays that have curved front panels, displays that have irregularly shaped back panels, etc.

Referring to the drawings, display mounting bracket 10 generally includes a horizontal mounting arm 100, vertical mounting arms 200 attached to horizontal mounting arm 100, display brackets 300 attached to opposing ends of vertical mounting arms 200, and compression pads 400 movably secured to vertical mounting arms 200.

In the embodiment shown, horizontal mounting arm 100 is an elongated, generally planar member having a longitudinal axis 105. A pair of opposing protrusions 110 extend from a back surface 115 of horizontal mounting arm 100 and are configured to receive mounting plate 120, which can be configured to be attached to another VESA standard compliant mounting plate or configured to be attached to any other type mounting plate or surface desired. As shown, protrusions 110 are generally L-shaped and are configured to receive a planar portion of mounting plate 120 between protrusions 110, but can be any size, shape, or configuration desired to receive a particular mounting plate. An aperture 125 is formed in a tab 130 extending orthogonal from back surface 115 of horizontal mounting arm 100 and is configured to receive threaded member 135 that threads into a threaded aperture in mounting plate 120 to attached and secure mounting plate 120 to horizontal mounting arm 100. A plurality of slots 145 are formed in opposing edges 140 of horizontal mounting arm 100 and are spaced apart in a direction parallel to longitudinal axis 105. As described in more detail below, slots 145 are configured to receive protrusions 245 extending from vertical mounting arms 200 to allow vertical mounting arms 200 to be positioned in multiple positions along horizontal mounting arm 100.

Each vertical mounting arm 200 extends along a longitudinal axis 205 and has an adjustable length L defined between a first end 210 and an opposing second end 215, which allows vertical mounting arms 200 to be adjusted to fit displays having various heights. Although any manner of adjusting length L of vertical mounting arms 200 can be employed, in the embodiment shown, length L of vertical mounting arms 200 is adjusted by sliding a generally U-shaped first arm member 220 along/within a generally U-shaped second arm member 225 to adjust the desired length L and then securing first arm member 220 to second arm member 225 by inserting a threaded member 230 through slot 235 in second arm member 225 and threading it into threaded aperture 240 in first arm member 220. Although two vertical mounting arms 200 are used in the embodiment shown, any number of vertical mounting arms 200 can be used depending on the size and weight of the display and the particular application.

Vertical mounting arms 200 are movable in relation to horizontal mounting arm 100 such that vertical mounting arms 200 are positionable at multiple positions along longitudinal axis 105 of horizontal mounting arm 100 and horizontal mounting arm 100 is positionable at multiple positions along longitudinal axis 205 of vertical mounting arms 200. The adjustability of horizontal mounting arm 100 along longitudinal axis 205 of vertical mounting arms 200 allows placement of horizontal mounting arm 100 at various positions relative to the center of display 20 to locate horizontal mounting arm 100 at an optimal mounting location and to avoid blocking any receptacles, ports (e.g., power, USB, HDMI, etc.), controls, etc. located on the back of display 20. Similarly, the adjustability of vertical mounting arms 200 along longitudinal axis 105 of horizontal mounting arm 100 allows placement of vertical mounting arms 200 to accommodate displays having different widths and at various positions along horizontal mounting arm 100 to locate vertical mounting arms 200 to avoid blocking any receptacles, ports (e.g., power, USB, HDMI, etc.), controls, etc. located on the back of display 20. To position vertical mounting arms 200 horizontally (along longitudinal axis 105) along horizontal mounting arm 100 and vertically (along longitudinal axes 205) relative to horizontal mounting arm 100 such that horizontal mounting arm 100 can be generally centered along length L of vertical mounting arms 200 or positioned along vertical mounting arms 200 at other desired positions to avoid blocking any receptacles, ports (e.g., power, USB, HDMI, etc.), controls, etc. located on the back of display 20, vertical mounting arms 200 have a plurality of protrusions 245 that are configured to engage slots 145 in horizontal mounting arm 100. Protrusions 245, which in the embodiment shown are formed as generally L-shaped hooks, extend from edges of vertical mounting arms 200 and are spaced apart along longitudinal axis 205 by a predetermined distance. The spacing of slots 145 along edge 140 of horizontal mounting arm 100 and the engagement of protrusions 245 in slots 145 allows vertical mounting arms 200 to be positioned at multiple positions horizontally along longitudinal axis 105 of horizontal mounting arm 100. In addition, the spacing of protrusions 245 along vertical mounting arms 200 allows horizontal mounting arm 100 to be positioned at multiple positions vertically along longitudinal axes 205 of vertical mounting arms 200. Once positioned, vertical mounting arms 200 are attached and secured to horizontal mounting arm 100 by threaded members 250 that extend through apertures 150 in horizontal mounting arm and are threaded into threaded apertures 255 in vertical mounting arms 200.

In the embodiment shown, display brackets 300 have a body portion 305 and a flange 310 that extends generally orthogonal to body portion 305. Display brackets 300 are attached to opposing first and second ends 210, 215 of vertical mounting arms 200 via threaded members 315 that extend through one of a plurality of apertures 320 in body portion 305 and are threaded into threaded apertures 265 in first and second ends 210, 215 of vertical mounting arms 200. The plurality of apertures 320 spaced longitudinally along body portion 305 of display brackets 300 allow display brackets 300 to be positioned in multiple positions to adjust the distance D between vertical mounting arms 200 and flanges 310 of display brackets 300 to accommodate displays having different depths. Display brackets 300 can also be attached to first and second ends 210, 215 of vertical mounting arms such that distance D is different at first end 210 and second end 215 for displays that may have differing depths at the top and bottom of the display. Attaching display brackets 300 via threaded members 315 also allows display brackets 300 to rotate relative to longitudinal axis 205 of vertical mounting arms 200 so that flanges 310 of display brackets 300 can be positioned parallel (for flat front displays) or tangent (for curved front displays) to front surface 25 of display 20.

Compression pads 400 engage back surface 30 of display 20 and are configured to bias or urge display 20 forward and into contact with flanges 310 of display brackets 300 to secure display 20. In the embodiment shown, there are four compression pads 400, two on each vertical mounting arm 200 and each corresponding to a respective display bracket 300. However, any number of compression pads can be used (e.g., one per vertical mounting arm or more than two per vertical mounting arm) so long as display 20 is sufficiently urged against flanges 310 of display brackets 300 to secure display 20. Compression pads 400 are movably secured to vertical mounting arms 200 via threaded posts 405 that are connected to the back of compression pads 400 and are threaded into threaded apertures 260 in vertical mounting arms 200 such that the distance between vertical mounting arms 200 and compression pads 400 is adjustable. To adjust the distance between compression pads 400 and vertical mounting arms 200, threaded posts 405 can be rotated in a first direction (e.g., clockwise) to move compression pads 400 toward vertical mounting arms 200 or rotated in a second direction (e.g., counter-clockwise) to move compression pads 400 away from vertical mounting arms 200 an toward engagement with back surface 30 of display 20. In the embodiment shown, compression pads 400 are rubber feet that can conform to back surface 30 of display 20 to allow compression pads 400 to be used with flat, angled, or curved back displays. Alternatively, compression pads 400 could also be made of a more rigid material and be connected to threaded posts 405 through ball joints, which would allow the more rigid compression pads to move to engage back surface 30 of display 20.

To mount a display 20 using the example display mounting bracket 10 length L of vertical mounting arms 200 is adjusted to correspond to a height H of display 20 by sliding first arm member 220 along/within second arm member 225 to obtain the desired length L and then securing first arm member 220 to second arm member 225 via threaded member 230.

Vertical mounting arms 200 are positioned horizontally along horizontal mounting arm 100, with the distance between vertical mounting arms determined based on the width of display 20. Preferably, vertical mounting arms 200 are positioned so that they do not block any receptacles, ports (e.g., power, USB, HDMI, etc.), controls, etc. located on the back of display 20 when display 20 is mounted in display mounting bracket 10 and such that display brackets 300 at opposing first and second ends 210, 215 of vertical mounting arms 200 are proximate the outer ends of display 20 to provide the greatest support. Vertical mounting arms 200 are also positioned vertically relative to horizontal mounting arm 100 so that horizontal mounting arm 100 does not block any receptacles, ports (e.g., power, USB, HDMI, etc.), controls, etc. located on the back of display 20 when display 20 is mounted in display mounting bracket 10 and is, preferably, generally centered along the length of vertical mounting arms 200. The respective protrusions 245 on vertical mounting arms 200 can then be inserted in a corresponding slot 145 in horizontal mounting arm 100 and vertical mounting arms 200 can be attached to horizontal mounting arm 100 via threaded members 250.

Display brackets 300 are attached to opposing first and second ends 210, 215 of vertical mounting arms 200 so that flanges 310 of display brackets 300 are spaced apart from vertical mounting arms 200 by distance D, which should be greater than the depth of display 20. The distance D can be determined based on which aperture 320 is used to receive threaded member 315. Display brackets 300 can also be rotated so that flanges 310 of display brackets 300 are parallel or tangent to front surface 25 of display 20 and secured to vertical mounting arms 200 via threaded members 315.

Display 20 can then be positioned between display brackets 300 and compression pads 400 can be adjusted by rotating threaded posts 405 until compression pads engage back surface 30 of display and front surface 25 of display 20 engages flanges 310 of display brackets 300 to secure display 20 between compression pads 400 and flanges 310.

Once display 20 is secured, horizontal mounting arm 100 can be attached to mounting pate 120.

While various embodiments have been described above, this disclosure is not intended to be limited thereto. Variations can be made to the disclosed embodiments that are still within the scope of the appended claims.

The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A display mounting bracket, comprising:
   a horizontal mounting arm;
   a mounting plate attached to the horizontal mounting arm;
   a first vertical mounting arm attached to the horizontal mounting arm, wherein the first vertical mounting arm is movable and positionable at multiple positions along a longitudinal axis of the horizontal mounting arm;
   a second vertical mounting arm attached to the horizontal mounting arm, wherein the second vertical mounting arm is movable and positionable at multiple positions along the longitudinal axis of the horizontal mounting arm;
   a first display bracket attached to a first end of the first vertical mounting arm and a second display bracket attached to a second end of the first vertical mounting arm, opposite the first end;
   a third display bracket attached to a first end of the second vertical mounting arm and a fourth display bracket attached to a second end of the second vertical mounting arm, opposite the first end;
   a first compression pad movably secured to the first vertical mounting arm; and
   a second compression pad movably secured to the second vertical mounting arm.

2. The display mounting bracket of claim 1, wherein the horizontal mounting arm comprises a pair of opposing protrusions configured to receive the mounting plate and an aperture configured to receive a threaded member to secure the mounting plate to the horizontal mounting arm.

3. The display mounting bracket of claim 2, wherein the mounting plate is configured to be attached to a VESA standard compliant mounting plate.

4. The display mounting bracket of claim 1, wherein:
   the horizontal mounting arm comprises a plurality of slots formed in an edge of the horizontal mounting arm and spaced apart along the longitudinal axis of the horizontal mounting arm;
   the first vertical mounting arm comprises a first plurality of protrusions spaced apart along a longitudinal axis of the first vertical mounting arm, the first plurality of protrusions configured to engage the plurality of slots in the horizontal mounting arm such that the first vertical mounting arm is positionable at multiple positions along the longitudinal axis of the horizontal mounting arm and at multiple positions along the longitudinal axis of the first vertical mounting arm; and
   the second vertical mounting arm comprises a second plurality of protrusions spaced apart along a longitudinal axis of the second vertical mounting arm, the second plurality of protrusions configured to engage the plurality of slots in the horizontal mounting arm such that the second vertical mounting arm is positionable at multiple positions along the longitudinal axis of the horizontal mounting arm and at multiple positions along the longitudinal axis of the second vertical mounting arm.

5. The display mounting bracket of claim 1, wherein the first and second vertical mounting arms are secured to the horizontal mounting arm by threaded members extending through apertures in the horizontal mounting arm and threaded into threaded apertures in the first and second vertical mounting arms.

6. The display mounting bracket of claim 1, wherein a length of the first and second vertical mounting arms is adjustable.

7. The display mounting bracket of claim 1, wherein the first, second, third, and fourth display brackets have a body portion and a flange that extends generally orthogonal to the body portion.

8. The display mounting bracket of claim 7, wherein:
   the first and second display brackets are positionable in multiple positions to adjust a distance between the first vertical mounting arm and the flanges of the first and second display brackets; and
   the third and fourth display brackets are positionable in multiple positions to adjust a distance between the second vertical mounting arm and the flanges of the third and fourth display brackets.

9. The display mounting bracket of claim 8, wherein the first and second display brackets are rotatable relative to the longitudinal axis of the first vertical mounting arm and the third and fourth display brackets are rotatable relative to the longitudinal axis of the second vertical mounting arm.

10. The display mounting bracket of claim 1, wherein:
    the first compression pad is movably secured to the first vertical mounting arm through a first threaded post that is threaded into a threaded aperture in the first vertical mounting arm such that a distance between the first vertical mounting arm and the first compression pad is adjustable; and
    the second compression pad is movably secured to the second vertical mounting arm through a second threaded post that is threaded into a threaded aperture in the second vertical mounting arm such that a distance between the second vertical mounting arm and the second compression pad is adjustable.

11. The display mounting bracket of claim 10, wherein the first and second compression pads are attached to the first and second threaded posts through ball joints.

12. A method of mounting a display, comprising:
    adjusting a length of a first vertical mounting arm and a length of a second vertical mounting arm to correspond to a height of the display;
    positioning the first and second vertical mounting arms horizontally along a horizontal mounting arm, wherein a distance between the first and second mounting arms is determined based on a width of the display, and vertically relative to the horizontal mounting arm such that the horizontal mounting arm is generally centered along the length of the first vertical mounting arm and the length of the second vertical mounting arm and attaching the first vertical mounting arm and the second vertical mounting arm to the horizontal mounting arm;

attaching a first pair of display brackets to a first end and a second end of the first vertical mounting arm such that a flange of each of the pair of display brackets is spaced apart from the first vertical mounting arm by a distance that is greater than a depth of the display and the flanges are parallel or tangent to a front surface of the display and attaching a second pair of display brackets to a first end and a second end of the second vertical mounting arm such that a flange of each of the pair of display brackets is spaced apart from the second vertical mounting arm by a distance that is greater than the depth of the display and the flanges are parallel or tangent to the front surface of the display;

positioning the display between the first pair of display brackets and the second pair of display brackets;

adjusting a plurality of compression pads movably secured to the first vertical mounting arm and the second vertical mounting arm to secure the display between the plurality of compression pads and the flanges of the first and second pairs of display brackets; and attaching the horizontal mounting arm to a mounting plate.

13. The method of claim 12, wherein the first and second vertical mounting arms are positioned horizontally along the horizontal mounting arm and vertically relative to the horizontal mounting arm by inserting a protrusion of a plurality of protrusions on the first vertical mounting arm into a first slot of a plurality of slots formed in an edge of the horizontal mounting arm and inserting a protrusion of a plurality of protrusions on the second vertical mounting arm into a second slot of the plurality of slot in the horizontal mounting arm.

14. The method of claim 13, wherein the plurality of protrusions on the first vertical mounting arm are spaced apart along a longitudinal axis of the first vertical mounting arm, the plurality of protrusions on the second vertical mounting arm are spaced apart along a longitudinal axis of the second vertical mounting arm, and the plurality of slots spaced apart along a longitudinal axis of the horizontal mounting arm.

15. The method of claim 13, wherein the first and second vertical mounting arms are attached to the horizontal mounting arm inserting threaded members through apertures formed in the horizontal mounting arm and threading the threaded members into threaded apertures formed in the first and second vertical mounting arms.

16. The method of claim 12, wherein:
the first pair of display brackets are attached to the first and second ends of the first vertical mounting arm by inserting threaded members through a selected aperture of a plurality of apertures in each of the first pair of display brackets and threading the threaded members into threaded apertures in the first and second ends of the first vertical mounting arm; and
the second pair of display brackets are attached to the first and second ends of the second vertical mounting arm by inserting threaded members through a selected aperture of a plurality of apertures in each of the second pair of display brackets and threading the threaded members into the threaded apertures in the first and second ends of the second vertical mounting arm.

17. The method of claim 12, wherein:
the plurality of compression pads are movably secured to the first and second vertical mounting arms by threaded posts that are threaded into threaded apertures in the first and second vertical mounting arms; and
a distance between the first and second vertical mounting posts and the plurality of compression pads is adjustable by rotating the threaded posts within the threaded apertures in the first and second vertical mounting posts.

18. The method of claim 12, wherein the horizontal mounting arm is attached to the mounting plate by inserting the mounting plate between a pair of opposing protrusions in the horizontal mounting arm, inserting a threaded member through an aperture in the mounting plate, and threading the threaded member into a threaded aperture in the horizontal mounting arm.

19. A display mounting bracket, comprising:
a horizontal mounting arm;
a mounting plate attached to the horizontal mounting arm;
first and second vertical mounting arms attached to the horizontal mounting arm;
a means for adjusting a length of the first and second mounting arms;
a means for positioning the first and second vertical mounting arms horizontally along the horizontal mounting arm and vertically relative to the horizontal mounting arm such that the horizontal mounting arm is generally centered along the length of the first vertical mounting arm and the length of the second vertical mounting arm;
first and second display brackets attached to a first end and a second end of the first vertical mounting arm;
a means for adjusting a distance between a flange of each of the first and second display brackets and the first vertical mounting arm;
third and fourth display brackets attached to a first end and a second end of the second vertical mounting arm;
a means for adjusting a distance between a flange of each of the third and fourth display brackets and the second vertical mounting arm;
a first compression pad movably secured to the first vertical mounting arm;
a means for adjusting a distance between the first compression pad and the first vertical mounting arm;
a second compression pad movably secured to the second vertical mounting arm; and
a means for adjusting a distance between the second compression pad and the second vertical mounting arm.

20. The display mounting bracket of claim 19, wherein:
the means for positioning the first and second vertical mounting arms comprises a plurality of slots formed in an edge of the horizontal mounting arm and spaced apart along a longitudinal axis of the horizontal mounting arm, a first plurality of protrusions spaced apart along a longitudinal axis of the first vertical mounting arm and configured to engage the plurality of slots in the horizontal mounting arm, and a second plurality of protrusions spaced apart along a longitudinal axis of the second vertical mounting arm and configured to engage the plurality of slots in the horizontal mounting arm;
the means for adjusting the distance between the flanges of the first and second display brackets and the first vertical mounting arm comprises threaded members inserted through a selected aperture of a plurality of apertures in each of the first and second display brackets and threaded into threaded apertures in first and second ends of the first vertical mounting arm;
the means for adjusting the distance between the flanges of the third and fourth display brackets and the second vertical mounting arm comprises threaded members inserted through a selected aperture of a plurality of apertures in each of the third and fourth display brackets and threaded into threaded apertures in first and second ends of the first vertical mounting arm;

the means for adjusting the distance between the first compression pad and the first vertical mounting arm comprises a threaded post threaded into a threaded aperture in the first vertical mounting arm and connected to the first compression pad; and the means for adjusting the distance between the second compression pad and the second vertical mounting arm comprises a threaded post threaded into a threaded aperture in the second vertical mounting arm and connected to the second compression pad.

* * * * *